(12) United States Patent
Megiddo et al.

(10) Patent No.: US 7,209,913 B2
(45) Date of Patent: Apr. 24, 2007

(54) METHOD AND SYSTEM FOR SEARCHING AND RETRIEVING DOCUMENTS

(75) Inventors: Nimrod Megiddo, Palo Alto, CA (US); Andrew S. Tomkins, San Jose, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 10/034,477

(22) Filed: Dec. 28, 2001

(65) Prior Publication Data

US 2003/0126117 A1 Jul. 3, 2003

(51) Int. Cl.
*G06F 17/30* (2006.01)
*G06F 7/00* (2006.01)

(52) U.S. Cl. .............................. 707/3; 707/10; 707/100; 707/102; 709/201

(58) Field of Classification Search ................ 707/2–6, 707/10, 101, 102, 104.1, 100; 709/203, 219, 709/201; 715/534
See application file for complete search history.

(56) References Cited

U.S. PATENT DOCUMENTS

| | | | |
|---|---|---|---|
| 5,511,159 A | 4/1996 | Baker et al. ................ | 395/161 |
| 5,794,177 A | 8/1998 | Carus et al. ................... | 704/9 |
| 5,832,480 A * | 11/1998 | Byrd et al. ..................... | 707/5 |
| 5,848,410 A * | 12/1998 | Walls et al. .................... | 707/4 |
| 5,940,825 A | 8/1999 | Castelli et al. ................. | 707/6 |
| 6,009,422 A | 12/1999 | Ciccarelli ....................... | 707/4 |
| 6,065,056 A | 5/2000 | Bradshaw et al. .......... | 709/229 |

(Continued)

OTHER PUBLICATIONS

Gonzalo Navarro and Ricardo Baeza-Yates, "Proximal Nodes: A Model to Query Document Databases by Content and Structure", ACM Transactions on Information Systems, vol. 15, No. 4, Oct. 1997, p. 400-435.

(Continued)

*Primary Examiner*—John Cottingham
*Assistant Examiner*—Susan Rayyan
(74) *Attorney, Agent, or Firm*—Kevin Kaschke; Marc D. McSwain (57) ABSTRACT

A system (100) for searching and retrieving documents includes a database (106), a memory device (108), a user interface device (102) and a controller (104). The database (106) stores documents. The memory device (108) stores software, tokens and an index. The software performs methods according to a background routine (118) and a foreground routine (116). Each token (e.g., speed) has related expressions (e.g., miles per hour, mph, kilometers per hour, and kph) assigned thereto that define the token. The index has documents, having an occurrence of one of the related expressions for one of the tokens, assigned to the one of the tokens. The user interface device (102) accepts and sends search queries having a token and receives information related to the documents, having an occurrence of the related expressions for the token, responsive to a user interface process (120). The controller (104) is electrically coupled to the memory device (108), the user interface device (102) and the database (106). The controller (104) manages communications between the memory device (108) and the user interface device (102) responsive to the foreground routine (116) in the software to respond to the search queries having the token. The controller (104) also manages communications between the memory device (108) and the database (106) responsive to the background routine (118) in the software to create the index.

3 Claims, 4 Drawing Sheets

U.S. PATENT DOCUMENTS

| | | | |
|---|---|---|---|
| 6,125,361 A | 9/2000 | Chakrabarti et al. | 707/3 |
| 6,269,370 B1* | 7/2001 | Kirsch | 707/10 |
| 6,289,342 B1* | 9/2001 | Lawrence et al. | 707/7 |
| 6,377,945 B1* | 4/2002 | Risvik | 707/3 |
| 6,704,728 B1* | 3/2004 | Chang et al. | 707/5 |
| 6,738,780 B2* | 5/2004 | Lawrence et al. | 707/101 |
| 6,785,677 B1* | 8/2004 | Fritchman | 707/6 |
| 6,965,894 B2* | 11/2005 | Leung et al. | 707/10 |

OTHER PUBLICATIONS

Jochen Dorre et al., "Text Mining: Finding Nuggets in Mountains of Textual Data", Proceedings of the Fifth ACM SIGKDD International Conference on Knowledge Discovery and Data Mining, Aug. 15-18, 1999, San Diego, CA, p. 398-401.

Jonas S. Karlsson and Martin L. Kersten, "Omega-Storage: A Self Organizing Multi-Attribute Storage Technique for Very Large Main Memories", Technical Report INS-R9910, CWI, Amsterdam, The Netherlands, Sep. 1999.

Owen de Kretser and Alistair Moffat, "Needles and Haystacks: A Search Engine for Personal Information Collections", Proceedings of the 23rd Australasian Computer Science Conference, Canberra, Australia, Feb. 2000, p. 58-65.

Hughey, M.K. and Berry, M.W., "Improved Query Matching Using kd-Trees: A Latent Semantic Indexing Enhancement", Information Retrieval, vol. 2, No. 4, 2000, p. 287-302.

Maderiechner, G. et.al., "Classification of Documents by Form and Content", Pattern Recognition Letters, vol. 18, No. 11-13, Nov. 1997, p. 1225-1231.

* cited by examiner

FIG. 2

METHOD AND SYSTEM FOR SEARCHING AND RETRIEVING DOCUMENTS

FIELD OF THE INVENTION

The present invention relates generally to document retrieval, and more particularly to a method and system for searching and retrieving documents.

BACKGROUND OF THE INVENTION

Numerous search engines are currently available for searching large collections of documents such as the entire world-wide-web. A search is performed in response to a query provided by a user, wherein the query typically includes keywords and logical connectors. Different search engines handle queries in different ways and some of them support "advanced" searching. The results of a search are typically reported in the form of a ranked list of documents, which the user may examine. Sometimes the returned list may consist of hundreds to thousands of documents. The number of documents that the user can manually examine is naturally quite limited so, if a relevant document cannot be found among relatively few documents at the top of the list, the search results are not very useful.

Various methods for recognizing keywords in a search query are well known. An "alphabet" is a set of symbols. For example, a first alphabet may include only the digits 0 and 1, and a second alphabet may include all the lower-case a–z and upper-case letters A–Z. For text search purposes, the alphabet is either the ASCII character set, coded with numbers 0–127, or the entire set of 256 characters coded 0–255. A "string" is a finite sequence of symbols from the alphabet. Thus, the string "0110101" is a string over the alphabet set of $\{0,1\}$ and AbZYe is a string over the alphabet set of lower-case and upper case letters. A "language" is a set of strings. A computer program recognizes a particular language, if the program can tell for any given string whether or not the string is in the language.

A "regular expression" is a simple description of a language that is recognized by simple computer programs called finite automata. The simplest type of an expression is a single symbol. More complicated expressions can be constructed from simpler expressions by applying operations. For example, the expression '(o+i)n' refers to the set $\{on,in\}$ and can be described as "either an 'o' or an 'i', followed by an 'n'". Further, by example, the expression '(s+t)(i+o)n' refers to the set $\{sin,son, tin,ton\}$.

The concepts of alphabet and regular expression, described above, are further explained by the example of recognizing times that are expressed in hours and minutes, e.g., 11:43, 09:32, 7:19, etc. Here the alphabet consists of the numerals 0,1, . . . , 9 and the colon :. The first digit of the minutes part can be defined as $M1=\{0, \ldots, 5\}$ whereas the second digit of the minutes part can be defined as $M2=\{0, \ldots, 9\}$. Next, the minutes part, MIN, is defined by the concatenation operation MIN=(M1)(M2)=$\{00, 01, \ldots, 09, 10, 11, \ldots, 59\}$. Similarly, the hours part, HOUR, can be expressed by defining H1=$\{1, \ldots, 9\}$, H1=$\{0,1\}$, H2=H1+(2)=$\{0,1,2\}$, so that HOUR=(H1)+(0)(H1) +(1)(H2) (i.e., the hour part is either a numeral from the set $\{1, \ldots, 9\}$, the numeral 0 followed by a numeral from the set $\{1, \ldots, 9\}$, or the numeral 1 followed by a numeral from the set $\{0,1,2\}$. Finally, the time is TIME=(HOUR)(:)(MIN).

A "lexical analyzer" is a computer program that receives text and recognizes strings described by a regular expression. A "parser" is a program that analyzes a stream of lexical units according to a given grammar. For a specific language, a lexical analyzer finds within any given text all the occurrences of strings described by the regular expression. The lexical analyzer converts characters or sequences of characters into so-called conventional tokens that become atomic units that are passed to a parser. A "lexical analyzer generator" is a computer program that receives a regular expression and generates a corresponding lexical analyzer. A well-known lexical analyzer generator is LEX, which is supplied together with most of the UNIX systems. LEX typically works with YACC, which is a parser generator, i.e., a program that generates a parser corresponding to a given set of grammar rules.

The example of TIME can be processed by LEX if given in the form of a set of so-called "lexical rules." The notation can be explained as follows. Each rule ends with a semicolon. Each rule consists of two parts separated by a colon. The first part of the rule is a conventional token that is defined by the second part of the rule. The vertical bar | signifies the logical "or" and alphanumeric characters are denoted by '0', '1', etc. For any two characters a, b, the notation [a–b] stands for any one character that occurs between a and b in the standard order on the set of characters. So, [1–9] means any one of the digits 1,2, . . . , 9. Conventional tokens that occur in the second part must also appear in the first part of exactly one of the rules or declared in advance as "terminal" conventional tokens. The example of TIME, processed by LEX, is illustrated as follows.

time : hours':' minutes;

hours : [1–9] |'0'[0–9]|'1' [0–2];

minutes : [0–5][0–9];

The following example explains one of the weaknesses of conventional search methods that support only keyword queries. Suppose a user wanted to find documents that described how many workers were laid off. A query such as "laid off" is inadequate for this purpose since too many pages are returned with no number as desired. When this query was inputted into present conventional search engines, the Google search engine returned 47,600 hits, and the AltaVista search engine found 75,683 hits. Only a small fraction of these hits were relevant. In this case, numbers convey quantitative information, so it would be desirable to filter out occurrences of the phrase "laid off" in documents where no number is mentioned.

Accordingly, there is a need for a method and system for searching and retrieving documents that permits users to search and retrieve a greater number of relevant documents in a shorter amount of time.

SUMMARY OF THE INVENTION

A system for searching and retrieving documents includes a database, a memory device, a user interface device and a controller. The database stores documents. The memory device stores software, tokens and an index. The software performs methods according to a background routine and a foreground routine. Each token has related expressions assigned thereto that define the token. The index holds records, each corresponding to at least one token or keyword, having at least one occurrence of one of the related expressions for one of the tokens, assigned to the tokens. The user interface device accepts and sends search queries having a token and receives information related to the documents, having an occurrence of the related expressions for the token, responsive to a user interface process. The controller, electrically coupled to the memory device, the user interface device and the database, manages communications between the memory device and the user interface device responsive to the foreground routine in the software to respond to the search queries having the token, and manages communications between the memory device and the database responsive to the background routine in the software to create the index.

The method performed by the user interface process includes the steps of: receiving from an input source a search query that includes at least one token, wherein related expressions are assigned to the at least one token; sending the search query to a search engine responsive to the step of receiving; and receiving from the search engine information related to documents, having an occurrence of at least one of the related expressions for at least one of the token, responsive to the step of sending.

The method performed by the background routine in the software includes the following steps. The method performs the steps of determining tokens and assigning related expressions to each of the tokens responsive to the step of determining to define each of the tokens. Then the method performs the steps of searching documents responsive to the step of assigning and identifying occurrences of any of the related expressions for any of the tokens in any of the documents responsive to the step of searching. Then the method performs the step of assigning each of the documents, having at least one of the related expressions for at least one of the tokens, to the at least one of the tokens responsive to the step of identifying to create an index.

The method performed by the foreground routine in the software includes the following steps. The method performs the steps of receiving a search query and identifying at least one token in the search query responsive to the step of receiving, wherein related expressions are assigned to the at least one token. Then the method performs the step of finding the at least one token in an index to identify documents, having an occurrence of at least one of the related expressions for the at least one of the tokens, corresponding to at least one the tokens responsive to the step of identifying. Then the method performs the step of providing information related to the documents responsive to the step of finding.

These and other aspects of the present invention are further described with reference to the following detailed description and the accompanying figures, wherein the same reference numbers are assigned to the same features or elements illustrated in different figures. Note that the figures may not be drawn to scale. Further, there may be other embodiments of the present invention explicitly or implicitly described in the specification that are not specifically illustrated in the figures and visa versa.

DETAILED DESCRIPTION OF THE PREFERRED EMBODIMENTS

A system 100 for searching and retrieving documents includes a database 106, a memory device 108, a user interface device 102 and a controller 104. The database 106 stores documents. The memory device 108 stores software, tokens and an index. The software performs methods according to a background routine 118 and a foreground routine 116. Each token (e.g., speed) has related expressions (e.g., miles per hour, mph, kilometers per hour, and kph) assigned thereto that define the token. The index holds records, each having an occurrence of one of the related expressions for one of the tokens, assigned to the one of the tokens. The user interface device 102 accepts and sends search queries having a token and receives information related to the documents, having an occurrence of the related expressions for the token, responsive to a user interface process 120, illustrated in the flowchart shown in FIG. 4. The controller 104 is electrically coupled to the memory device 108, the user interface device 102 and the database 106. The controller 104 manages communications between the memory device 108 and the user interface device 102 responsive to the foreground routine 116 in the software, illustrated in the flowchart shown in FIG. 3, to respond to the search queries having the token. The controller 104 also manages communications between the memory device 108 and the database 106 responsive to the background routine 118 in the software, illustrated in the flowchart shown in FIG. 2, to create the index.

Figure 1:
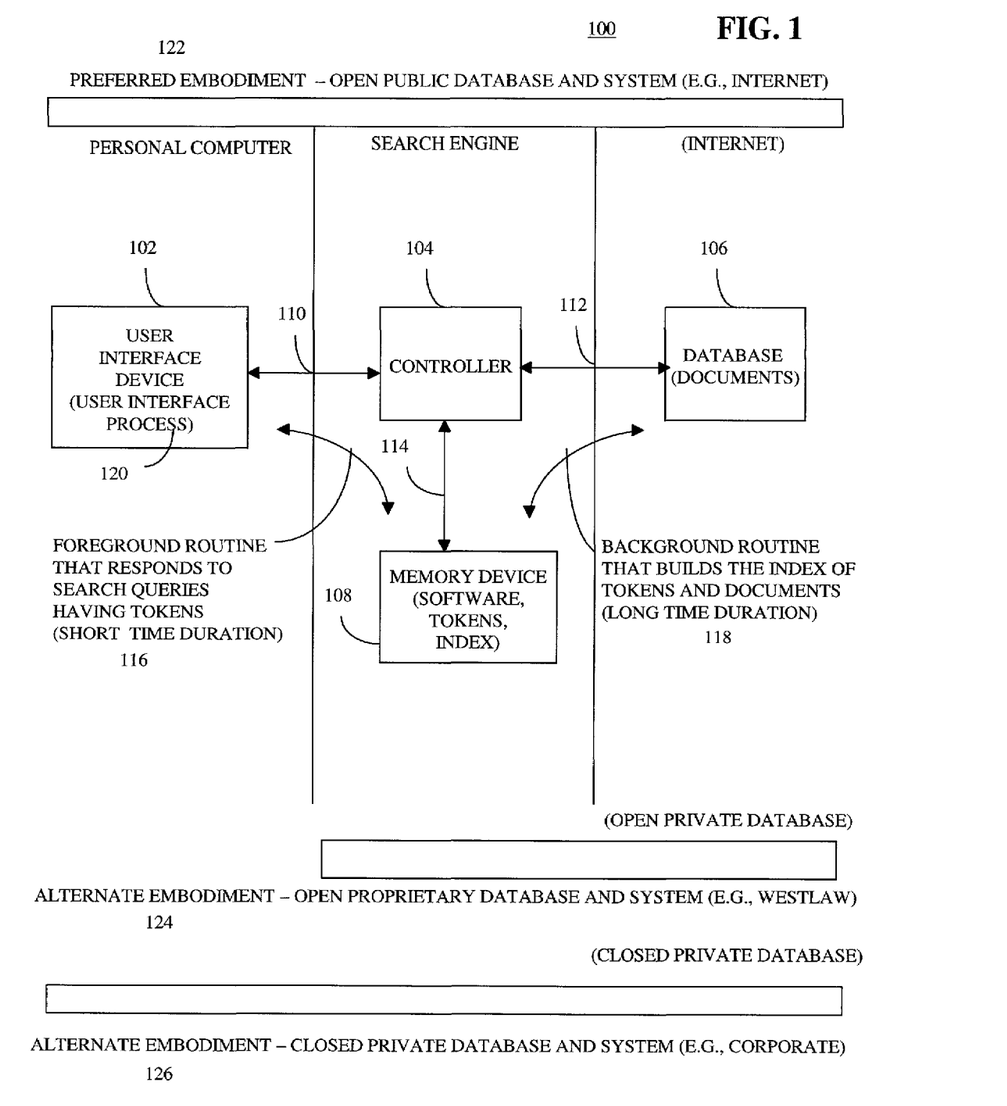
FIG. 1 illustrates a block diagram of a system for searching documents including a user interface device, a memory device having software, a database and a controller, in accordance with a preferred embodiment of the present invention.

The controller 104 communicates with the memory device 108 over a communication bus 114. The controller 104 communicates with the user interface device 102 over a communication bus 110. The controller 104 communicates with the database 106 over a communication bus 112. Each communication bus 110, 112 and 114 may comprise one or more dedicated or multiplexed lines.

Generally, the controller 104 and the memory device 108 together form a search engine. The controller 104 may comprise various levels of sophistication including a microcomputer, a digital signal processor, a personal computer, a workstation, a server, a mainframe, and the like, as is well known in the art of search engines. The memory device 108 may also be implemented in various forms such as random access memory (RAM) and read only memory (ROM), and the like, as are well known in the art of memory devices. In the preferred embodiment of the present invention, the memory device 108 is implemented as random access memory (RAM). The controller 104 and the memory device 108 may be separate elements or integrated into a single element.

In the preferred embodiment of the present invention 122, the search engine is privately owned and available to the public via the Internet or the World Wide Web, such as those search engines maintained by and available from companies like AltaVista, Yahoo and Google. Alternatively 124, the search engine may be privately owned and available to the public via the Internet or the World Wide Web or via a direct, dedicated connection, such as those search engines maintained by and available from companies like Westlaw, Lexis and Dialog. Alternatively 126, the search engine may be privately owned and not available to the public, such as those search engines maintained by and available from internal companies or corporations. In this case, the search engine is typically open to all or select company employees to search, but closed to the public to search. Note that various combinations of these three embodiments may also be implemented, if appropriate and desired.

The tokens in the memory device 108 are intended to be part of a search query received by the search engine. The tokens have a predetermined format and have a predetermined meaning. The predetermined format of the tokens includes one or more predetermined keywords that are identified by one or more predetermined identifiers, such as predetermined characters or styles. Examples of the predetermined keywords include, without limitation, month, time, date, distance, speed, temperature, currency, internet protocol (IP) address, etc. Hence, the number of the one or more predetermined keywords for the tokens would preferably be in the hundreds, thousands or hundreds of thousands to permit easy and intuitive use by a person, without recall. Examples of the predetermined characters include, without limitation, #, $, *, ( ), { }, [ ], " ", /, and < >. Examples of the predetermined styles include, without limitation, bold, italics, underline, and caps. Hence, the number of the predetermined identifiers would preferably be very limited such as one to permit easy recall and use by a person. The purpose of the predetermined identifier is to characterize or distinguish the predetermined keywords as a token among other one or more keywords that are not tokens.

The predetermined meaning or definition of the tokens includes different related expressions for the same predetermined keyword. For example, a predetermined keyword "month," may have different related expressions, such as, January, Jan, Jan., 1-, 1/, and the like, as well as, similar expressions for the remaining eleven months. The purpose of the different related expressions for the same predetermined keyword is to permit a person to create a search query with a token when the person does not know how a desired particular expression was presented in a document. The related expressions for one of the tokens may be the same or different for another one of the tokens. For example, the expressions for one of the tokens would be the same as for another one of the tokens when the tokens are synonyms. How different or related the expressions are is a matter of predetermined design preference. Several examples of tokens are provided at the end of this description.

In essence, the token is predefined with multiple definitions that represent multiple ways of expressing the same or related thing in a search query. Tokens advantageously permit a person to expand their search query for multiple expressions of the same or related thing in a search query, without having to think of the multiple expressions and entering them, individually or in combination, while creating the search query. Hence, the tokens provide a powerful way to increase the effectiveness of creating search queries to retrieve greater numbers of relevant documents, and to avoid retrieving irrelevant documents.

The concept of tokens may be expanded in both a more general way and a more detailed way. In the more general way, tokens may be combined with other tokens to represent still another token. For example, the token "temperatures by month" may represent sum of the expressions for the "month" token, as described above, and the expressions for the "temperature" token, as described below. In the more detailed way, tokens may be further defined by modifiers in the search query to permit a search of only a portion of the predetermined definition of the token. For example the token "month of January" may represent the intersection of the expressions for the "month" token, as described above, and the expressions for "January," as described above, resulting in an effective search of the terms: January, Jan, Jan., 1-, 1/, and the like. The precise method of implementing the concept of expanding the tokens in the more general way and the more detailed way, such as how to combine tokens or how to modify tokens, respectively, is a matter of design preference. Further, search queries may include a combination of both of the techniques to expand the tokens in the more general way and the more detailed way.

Preferably, the using tokens in search queries would be used in combination with any other or all conventional method of creating search queries. Such conventional methods of creating search queries include, without limitation, logical connectors (e.g., AND, OR), range connectors (e.g., NEAR), attribute finders (e.g., AN/_____, wherein AN/ represents the "assignee" attribute of a patent and _____ represents the name of the assignee), and the like.

Note that the term "token" is used herein for the convenience of reference. However, the term "token" shall not be limiting and may otherwise be known as "lexical pattern," "predetermined keyword," "predetermined key phrase," "identified keyword," "identified key phrase," and the like. Further the phrase "different related expressions" is used, as defined above, shall not be limiting, and may be otherwise known as "limited semantics," "predetermined definitions," "assigned definitions," and the like.

The index in the memory device 108 builds on the concept of the tokens described above. Indexes are generally widely used and well known in the art of search engines. The general purpose of a conventional index is to assign one or more conventional keywords to corresponding documents having the one or more conventional keywords or phrases contained therein. The process of building a conventional index takes a relatively long amount of time in the range of hours, days, weeks or months, etc. However, once the conventional index is created, the conventional keywords received in a search query can be easily and quickly matched to the relevant documents in the database 106. This matching process takes a relatively short amount of time in the range of millisecond, seconds, minutes, etc. Hence, the conventional index maybe implemented as a lookup table and provides an intermediate tool to substantially increase the time for the search query to find the relevant documents.

In the preferred embodiment of the present invention, the index not only includes the one or more conventional keywords or phrases, but also, the tokens, as described above. In an analogous manner to the conventional index building process described above, the index assigns the tokens to corresponding documents having the tokens. In the preferred embodiment of the present invention, the index includes the location or address of the document where the document may be found, rather than the entire content of the document, because it would be impractical for the memory device 108 to store all of the documents found on the Internet.

To support the concept of expanding the tokens in the more general way and the more detailed way, as described above, the index may also include the combination of tokens and the modified tokens, respectively, and the documents corresponding thereto, to minimize the response time to search queries having such tokens. Alternatively, the concept of expanding the tokens in the more general way and the more detailed way, as described above, may be implemented by a search engine that determines in real time the union and the intersection, respectively, of the tokens and the documents corresponding thereto, if the resulting response time to search queries is reasonable. To support the concept of expanding the tokens in the more detailed way, as described above, the different related expressions are organized in the index, preferably in their naturally occurring order (e.g., time, numerical), to minimize the time to create the index either before or after receiving the search query having the modified token.

Figure 2:
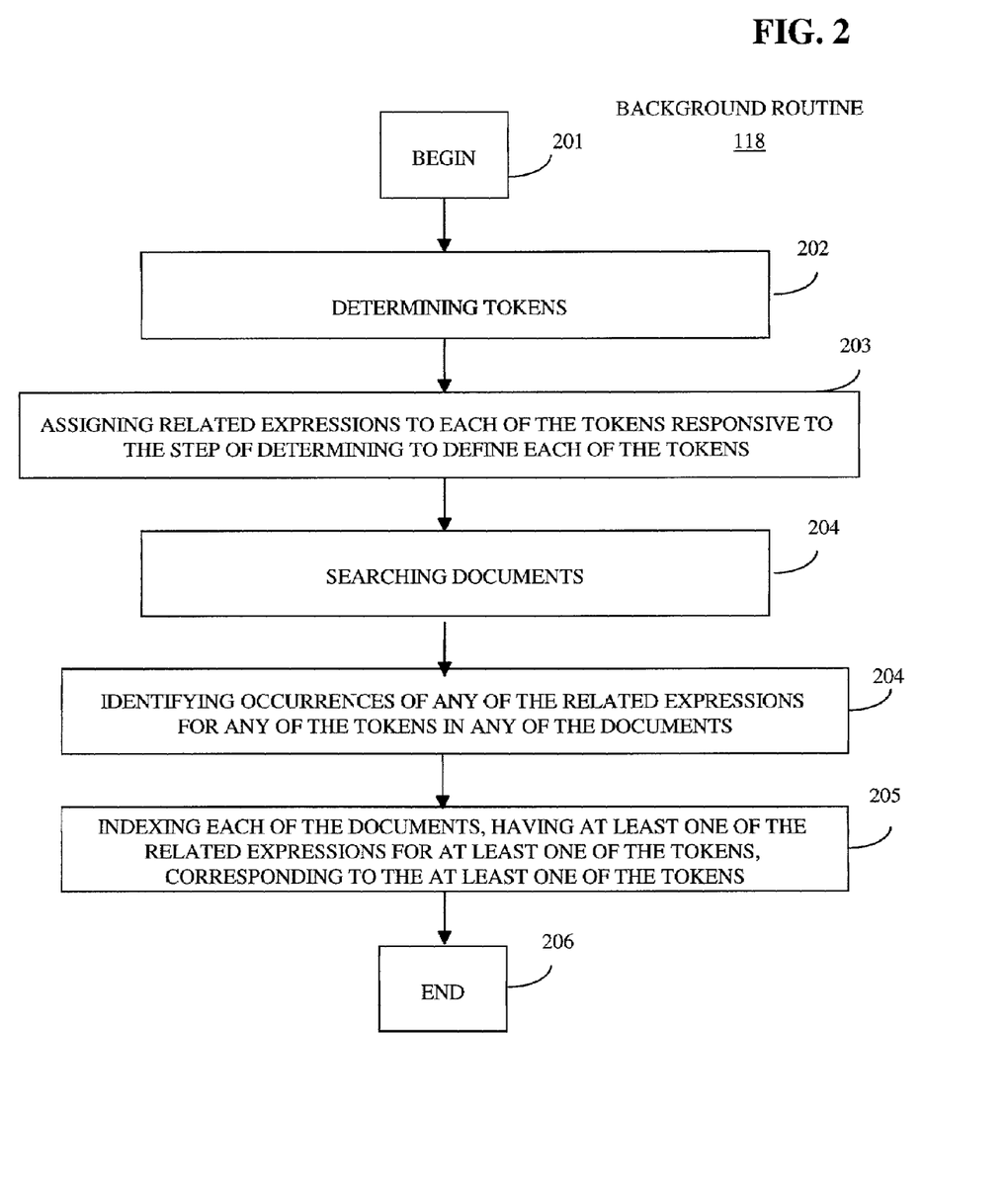
FIG. 2 illustrates a method performed by the controller for managing communications between the memory device and the database responsive to a background routine of the software, in accordance with a preferred embodiment of the present invention.
Figure 3:
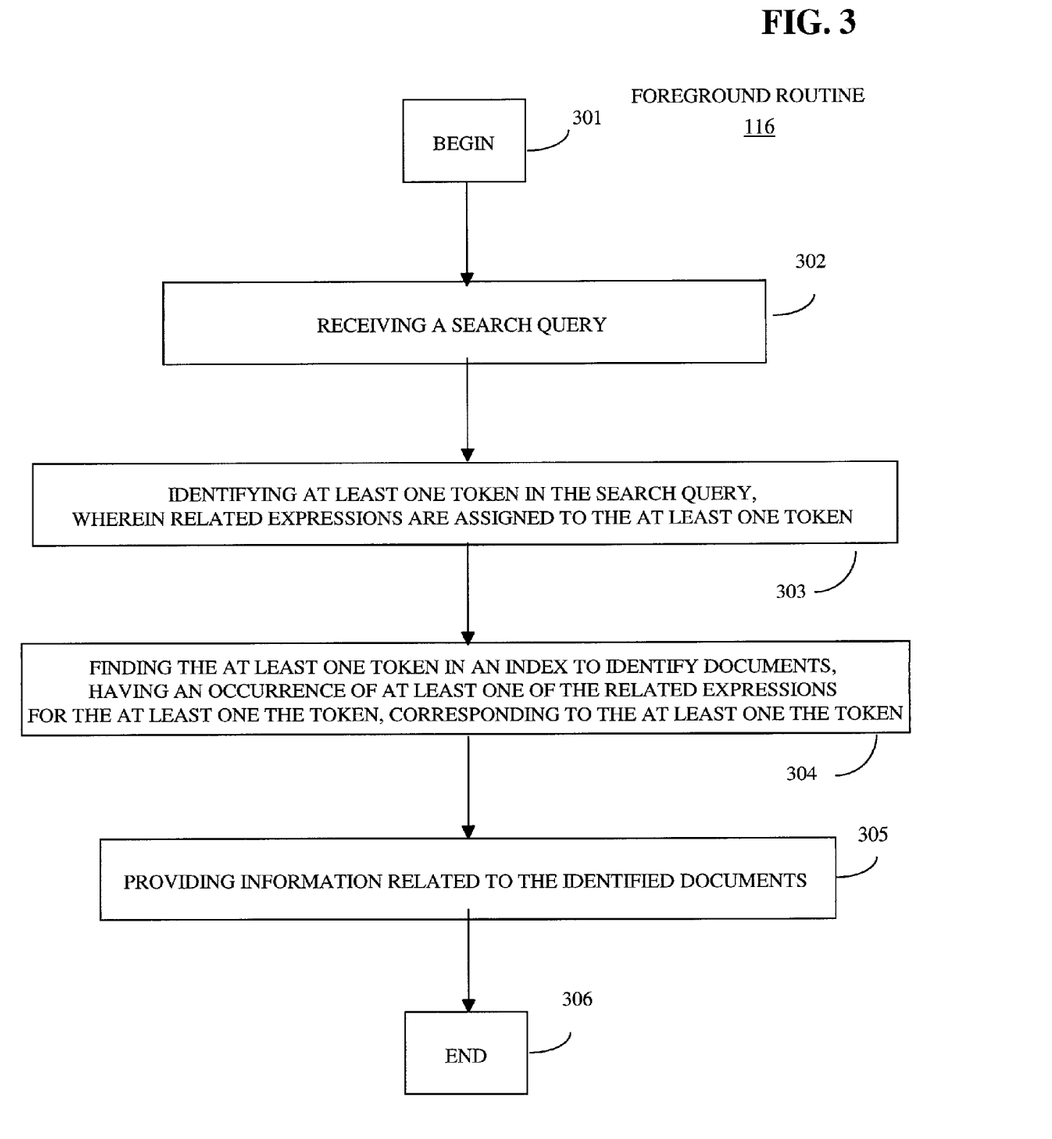
FIG. 3 illustrates a method performed by the controller for managing communications between the memory device and the user interface device responsive to a foreground routine of the software, in accordance with a preferred embodiment of the present invention.

The software, illustrated as flowcharts in FIGS. 2 and 3, in the memory device 108 forms a set of predetermined instructions to be followed by the controller 104. The software primarily includes the background routine 118, illustrated in the flowchart shown in FIG. 2, and the foreground routine 116, illustrated in the flowchart shown in FIG. 3. Generally, the background routine 118 causes the controller 104 to search the documents in the database 106 for the tokens, to create the index in the memory device 108. Further details about the background routine 118 are described with reference to FIG. 2. Generally, the foreground routine 116 causes the controller 104 to provide information related to the documents in the index responsive to receiving search queries having tokens from the user interface device 102. Further details about the foreground routine 116 are described with reference to FIG. 3.

The user interface device 102 is any type of device that can accept a search query having the token, send the search query to the controller 104, and receive information related to the relevant documents corresponding to the searched token. In the preferred embodiment of the present invention, the user interface device 102 is a personal computer. Alternatively, the user interface device 102 may include, without limitation, a personal digital assistant, a palm-sized computer, a laptop computer, a radiotelephone, a dedicated World Wide Web interface device, a kiosk, etcetera.

The database 106 is any type of device that stores documents and/or information related to the documents. In the preferred embodiment of the present invention, the database 106 is a storage device, implemented as read only memory (ROM). The ROM may be implemented as a hard drive, tapes, disks, compact disks, digital video disks, ZIP disks, and the like.

In the preferred embodiment of the present invention 122, the database 106 is a public database (e.g., Internet, world wide web) that includes thousands to millions of individual databases. In this case, the database 106 is open for the public to search. Alternatively 124, the database 106 may be a private database (e.g., Westlaw, Lexis, Dialog) that may include hundreds to thousands of individual databases. In this case, the database 106 is open to the public to search in return for a fee. Alternatively 126, the database 106 may be a private database (e.g., internal company or corporate) that may include tens to hundreds to thousands of individual databases. In this case, the database 106 is typically open to all or select company employees to search, but closed to the public to search. Note that various combinations of these three embodiments may also be implemented, if appropriate and desired.

The documents generally include any type of information that can be stored in the database. In the preferred embodiment of the present invention, the documents are text files. Alternatively, the documents may include, without limitation, video files and audio files. In the case of the video files the token would represent a video concept (e.g., Monet) and the related expressions would represent video clips (e.g., representations of Monet's individual visual works of art or portions thereof). In the case of the audio files the token would represent an audio concept (e.g., Mozart) and the related expressions would represent audio clips (e.g., representations of Mozart's individual audio works of art or portions thereof).

The information related to the documents generally includes any information about the documents including, without limitation, the entire content of the documents (e.g., an article, paper or book), portions of the content of the documents (e.g., abstracts, bibliography), and locations of the documents (e.g., IP address, web site address).

FIG. 2 illustrates a method performed by the controller 104 for managing communications between the memory device 108 and the user interface device 102 responsive to the background routine 118 of the software, in accordance with a preferred embodiment of the present invention. The purpose of the background routine 118 is to create the index, having the documents and the tokens, in the memory device 108.

At step 201, the method for performing the background routine begins.

At step 202, the method performs the step of determining tokens. The tokens, as described above, are predefined keywords or phrases and are chosen to be intuitive and easy to use, without recall.

At step 203, the method performs the step of assigning related expressions to each of the tokens responsive to the step of determining to define each of the tokens. The related expressions, as described above, represent the various ways the token may be described or identified. Steps 202 and 203 are typically performed manually by a computer programmer, but may be performed automatically using another software program designed to determine tokens and assign related expressions thereto. Hence, steps 202 and 203 may take considerable effort to create and to maintain, especially when the number of tokens in the thousands or hundreds of thousands.

At step 204, the method performs the step of searching documents responsive to the step of assigning. This step typically takes a relatively long time, as described above, especially in the case of searching the Internet.

At step 205, the method performs the step of identifying occurrences of any of the related expressions for any of the tokens in any of the documents responsive to the step of searching. This step also typically takes a long time, as described above, especially in the case of searching the Internet.

At step 206, the method performs the step of assigning each of the documents, having at least one of the related expressions for at least one of the tokens, corresponding to the at least one of the tokens responsive to the step of identifying to create the index. The index preferably includes the locations of the documents rather than the entire document, as described above.

At step 207, the method ends.

FIG. 3 illustrates a method performed by the controller 104 for managing communications between the memory device 108 and the user interface device 102 responsive to the foreground routine 116 of the software, in accordance with a preferred embodiment of the present invention. The purpose of the foreground routine 116 is to respond to search queries having tokens received from the user interface device 102 and to provide information related to the relevant documents to the user interface device 102.

At step 301, the method for performing the foreground routine begins.

At step 302, the method performs the step of receiving a search query, as is well known in the art.

At step 303, the method performs the step of identifying a token in the search query responsive to the step of receiving, wherein related expressions are assigned to the token. The search engine performs this step by looking for the predetermined identifier that identifies the predetermined keywords or phrases as a token.

At step 304, the method performs the step of finding the token in an index to identify documents, having an occurrence of the related expressions for the token, corresponding to the token responsive to the step of identifying. Because the index was already created using the background routine 118, this step is essentially a lookup process. If the token cannot be found in the index, the search engine may provide the user interface device 102 with feedback related to the accuracy of the token. Such feedback may include an error message, a list of similar tokens, a definition of the token, examples of tokens, etcetera, in an attempt to assist a person operating the user interface device 102.

At step 305, the method performs the step of providing information related to the documents responsive to the step of finding. This step essentially provides the user interface device 102 with the "hits" in the form of the documents or location of the documents, as described above.

At step 306, the method ends. Steps 301–306 are performed in a relatively short amount of time, as described above.

Figure 4:
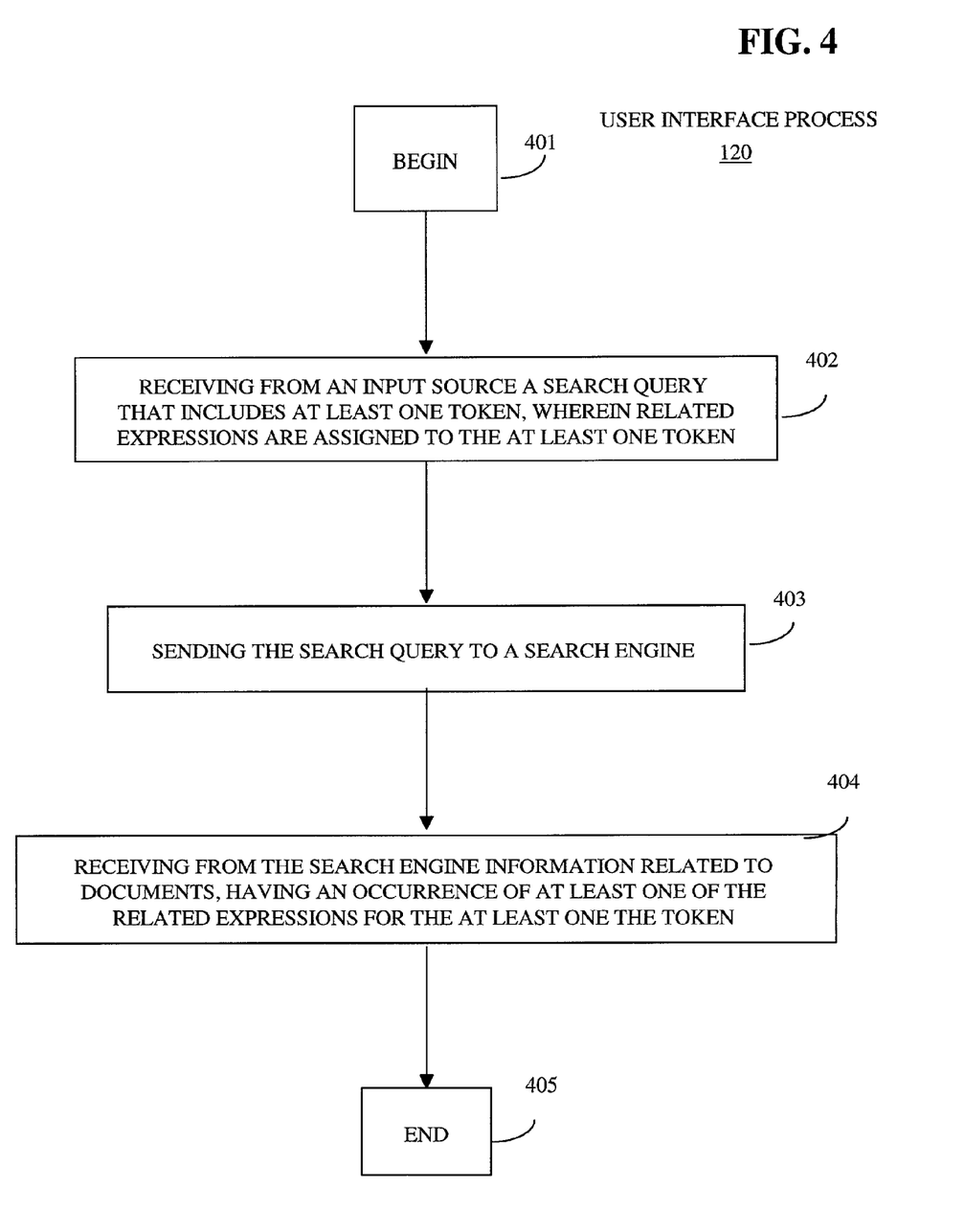
FIG. 4 illustrates a method performed by the user interface device for accepting and sending search queries and for receiving information related to documents responsive to a user interface process, in accordance with a preferred embodiment of the present invention.

FIG. 4 illustrates a method performed by the user interface device 102 for accepting and sending search queries and for receiving information related to documents responsive to a user interface process 120, in accordance with a preferred embodiment of the present invention. The purpose of the user interface process 120 is to accept and to send search queries to the search engine and to receive information related to the documents from the search engine.

At step 401, the method for performing the user interface process begins.

At step 402, the method performs the step of receiving from an input source a search query that includes at least one token, wherein related expressions are assigned to the at least one token. Preferably, the input source is a person that manually enters the search query, but may be automatically provided by a software program running a computer.

At step 403, the method performs the step of sending the search query to a search engine responsive to the step of receiving, as is well known in the art.

At step 404, the method performs the step of receiving from the search engine information related to documents, having an occurrence of at least one of the related expressions for the at least one the token, responsive to the step of sending, as described above.

At step 405, the method ends. Steps 401–405 also are performed in a relatively short amount of time because they are dependent upon the foreground routine 116 in the software.

The method and system for searching and retrieving documents, as described above, advantageously permits users to search and retrieve a greater number of relevant documents in a shorter amount of time. The advantage is particularly useful when searching tokens such as time, date, currency, and the like, that have numerical values, as explained by the following example. Suppose that a user is interested in finding information about the number of people that were laid off, rather than any stories about lay-offs. The user creates a query of the form: "*number NEAR laid off."

The string '*number' represents a token having the predetermined identifier (*) and the predetermined keyword (number). The token '*number' represents any numerical expression recognized by the search engine. The symbol 'NEAR' means that the phrase "laid off" and a number must occur in the text within a certain number of words (e.g., 4) from each other, as is well known in the art by itself. With such a query the search engine will return documents that have a numerical value (alpha or numeric, as defined by the search engine), within 4 words of the phrase "laid off," which are more relevant to the user. Further, for example, the user may create a query of the form "*number>1000 laid off" restricting attention only to numbers greater than 1000. Similarly, for example, dates can be restricted, for example "*date>6.30.1995," and so on.

In the preferred embodiment of the present invention, the following examples of tokens and their different related expressions are described as follows.

/*am/pm*/
%token AM PM am pm a.m. p.m.
/*Currency*/
%token USD U.S.$ dollar cents
%token Real AUD ATS BEF BP U.K.£ GBP CAD Yuan DKR Dkr Euro EUR
%token FF FFr FFR FFranc French FRF
%token German Deutche DM DMark DEM HKD Hong Kong
%token IDR Lire ITL Yen ¥en JPY
%token Fl Pta Forint
%token Rupiah SGD NIS Peso ESP Zloty Rouble Rand Won Skr SKR SEK
%token Swiss SF SFr SFranc SFR CHF Baht THB
/*day of week*/
%token SUN MON TUE WED THU FRI SAT
%token Sun Mon Tue Wed Thu Fri Sat
%token SUNDAY MONDAY TUESDAY WEDNESDAY THURSDAY FRIDAY SATURDAY
%token Sunday Monday Tuesday Wednesday Thursday Friday Saturday
/*distance and length*/
%token miles kilometers Km meters yards
%token centimeter cm foot feet inch inches
%token millimeter mm
/*month*/
%token JAN FEB MAR APR MAY JUN JUL AUG SEP OCT NOV DEC
%token JANUARY FEBRUARY MARCH APRIL MAY JUNE
%token JULY AUGUST SEPTEMBER OCTOBER NOVEMBER DECEMBER
%token January February March April May June
%token July August September October November December
/*speed*/
%token MPH mph KMH kmh per
/*temperature*/
%token Celsius Centigrade Fahrenheit
/*time*/
%token centuries decades years months weeks days hours minutes seconds
%token century decade year month week day hour minute second millisecond
%token yr mo hr min sec msec
/*time zones*/
%token GMT gmt
%token ET et EST est EDT edt
%token CT ct CST cst CDT cdt %token WT wt WST wst WDT wdt
%token PT pt PST pst PDT pdt Hence, while the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

What is claimed is:

1. A method, performed by a search engine, comprising:
 performing a background routine, during a first amount of time, including:
  determining tokens that have a predetermined meaning and follow a predetermined format including predetermined keywords predetermined and identifiers to help improve query processing;
  assigning related expressions to each of the tokens to define each of the tokens;
  searching documents;
  identifying occurrences of any of the related expressions for any of the tokens in any of the documents; and
  indexing each of the documents having at least one of the related expressions for at least one of the tokens, corresponding to the at least one of the tokens; and
 performing a foreground routine, during a second amount of time substantially less than the first amount of time, including:
  receiving a search query;
  identifying at least one token in the search query;
  finding the at least one token in an index to identify documents having an occurrence of at least one of the related expressions for the at least one token, corresponding to the at least one token; and
 providing at least one of the documents and the location of the documents.

2. A method according to claim 1 further comprising assigning related tokens to one of the tokens to further define the one of the tokens.

3. A method according to claim 1 wherein the identifying at least one token further comprises detecting a predetermined character that identifies at least one keyword as the at least one token.

* * * * *